United States Patent
Arco et al.

(10) Patent No.: US 7,629,298 B2
(45) Date of Patent: *Dec. 8, 2009

(54) SANDSTONE HAVING A MODIFIED WETTABILITY AND A METHOD FOR MODIFYING THE SURFACE ENERGY OF SANDSTONE

(75) Inventors: Manuel J. Arco, Woodbury, MN (US); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,177

(22) Filed: Jan. 11, 2008

(65) Prior Publication Data

US 2008/0113882 A1    May 15, 2008

Related U.S. Application Data (63) Continuation-in-part of application No. 11/466,611, filed on Aug. 23, 2006, now abandoned, which is a continuation-in-part of application No. 11/428,731, filed on Jul. 5, 2006, now abandoned.

(60) Provisional application No. 60/813,599, filed on Feb. 21, 2006.

(51) Int. Cl.
    C09K 8/60      (2006.01)
    C07F 7/10      (2006.01)
    C07F 7/04      (2006.01)
    C07C 307/00    (2006.01)
    C07C 311/00    (2006.01)

(52) U.S. Cl. .................... 507/205; 556/413; 564/80; 564/95

(58) Field of Classification Search ................. 556/413; 507/205
    See application file for complete search history.

(56) References Cited

U.S. PATENT DOCUMENTS

| | | | |
|---|---|---|---|
| 2,803,615 A | 8/1957 | Ahlbrecht et al. |
| 2,809,990 A | 10/1957 | Brown |
| 3,423,234 A | 1/1969 | Heine |
| 3,442,664 A | 5/1969 | Heine |
| 3,492,394 A | 1/1970 | Heine |
| 3,609,187 A | 9/1971 | Moore et al |
| 3,787,351 A | 1/1974 | Olson |
| 3,906,027 A | 9/1975 | Meussdoerffer et al. |
| 3,919,295 A | 11/1975 | Wechsberg et al. |
| 4,167,639 A | 9/1979 | Billenstein et al. |
| 4,557,837 A | 12/1985 | Clark, III et al. |
| 4,565,639 A | 1/1986 | Penny et al. |
| 4,702,849 A | 10/1987 | Penny |
| 5,042,580 A | 8/1991 | Cullick et al. |
| 5,207,996 A | 5/1993 | Sierakowski et al. |
| 5,274,159 A | 12/1993 | Pellerite et al. |
| 5,342,986 A | 8/1994 | Pohmer et al. |
| 5,358,052 A | 10/1994 | Gidley |
| 5,502,251 A | 3/1996 | Pohmer et al. |
| 5,529,125 A | 6/1996 | Di Lullo Arias et al. |
| 5,688,884 A | 11/1997 | Baker et al. |
| 5,702,509 A | 12/1997 | Pellerite et al. |
| 5,874,616 A | 2/1999 | Howells et al. |
| 6,155,749 A | 12/2000 | Tanner et al. |
| 6,206,102 B1 | 3/2001 | Pusch et al. |
| 6,280,883 B1 | 8/2001 | Lamanna et al. |
| 6,384,168 B1 | 5/2002 | Tanaka et al. |
| 6,443,230 B1 | 9/2002 | Boles et al. |
| 6,452,038 B1 | 9/2002 | Rao et al. |
| 6,579,572 B2 | 6/2003 | Espin et al. |
| 6,646,088 B2 | 11/2003 | Fan et al. |
| 6,660,693 B2 | 12/2003 | Miller et al. |
| 6,664,354 B2 | 12/2003 | Savu et al. |
| 6,689,854 B2 | 2/2004 | Fan et al. |
| 6,805,198 B2 | 10/2004 | Huang et al. |
| 6,890,452 B2 | 5/2005 | Parent et al. |
| 6,903,173 B2 | 6/2005 | Cernohous et al. |
| 6,945,327 B2 | 9/2005 | Ely et al. |
| 6,972,274 B1 | 12/2005 | Slikta et al. |
| 6,977,307 B2 | 12/2005 | Dams |
| 7,078,454 B2 | 7/2006 | Burleigh et al. |
| 7,160,850 B2 | 1/2007 | Dams et al. |
| 7,166,329 B2 | 1/2007 | Dams |
| 7,199,197 B2 | 4/2007 | Caldwell et al. |
| 2003/0224112 A1 | 12/2003 | Dams |
| 2005/0106326 A1 | 5/2005 | Audenaert et al. |

(Continued)

FOREIGN PATENT DOCUMENTS

CA        2009732        8/1990

(Continued)

OTHER PUBLICATIONS

English translation of Yoshioka et al. JP 60-126203.*

(Continued)

Primary Examiner—Mark Eashoo
Assistant Examiner—Peter F Godenschwager
(74) Attorney, Agent, or Firm—Kathleen B. Gross (57) ABSTRACT

Methods for modifying the wettability of sandstone. Compositions comprising sandstone having a modified wettability. Such wettability modifications may be useful, for instance, in improving the well-deliverability of an oil and/or gas well located in a sandstone formation.

22 Claims, 3 Drawing Sheets

U.S. PATENT DOCUMENTS

| | | |
|---|---|---|
| 2005/0142563 A1 | 6/2005 | Haddad et al. |
| 2006/0045979 A1 | 3/2006 | Dams |
| 2006/0147645 A1 | 7/2006 | Dams et al. |
| 2006/0148671 A1 | 7/2006 | Dams et al. |
| 2006/0149012 A1 | 7/2006 | Terrazas et al. |
| 2007/0029085 A1 | 2/2007 | Panga et al. |
| 2007/0225176 A1 | 9/2007 | Pope et al. |

FOREIGN PATENT DOCUMENTS

| | | |
|---|---|---|
| GB | 2218097 | 11/1989 |
| JP | 60126203 | 7/1985 |
| WO | WO 01/30873 | 5/2001 |
| WO | WO 02/16306 | 2/2002 |
| WO | WO 2005/028589 | 3/2005 |
| WO | WO 2006/077125 A1 | 7/2006 |

OTHER PUBLICATIONS

Adibhatla et al., "Effect of Surfactants on Wettability of Near-Wellbore Regions of Gas Reservoirs", Journal of Petroleum Science and Engineering, vol. 52, 2006, pp. 227-236.

Al-Anazi et al., "A Successful Methanol Treatment in a Gas-Condensate Reservoir: Field Application", SPE Production and Operations Symposium held in Oklahoma City, Oklahoma, Mar. 23-25, 2003, SPE 80901.

Fahes et al., "Wettability Alteration to Intermediate Gas-Wetting in Gas-Condensate Reservoirs at High Temperatures", SPE 96184, 2005.

Kissa, Erik, "Fluorinated Surfactants Synthesis Properties Applications", Surfactant Science Series, vol. 50, pp. 325-328 and 343, 1994.

Kumar, "Improving the Gas/Condensate Relative Permeabilities Using Chemical Treatments", Center for Petroleum and Geosystems, Engineering The University of Texas at Austin, Mar. 29, 2005.

Kumar et al., "Improving the Gas and Condensate Relative Permeability Using Chemical Treatments", presented at the 2006 SPE Gas Technology Symposium held in Calgary, Alberta, Canada, May 15-17, 2006, SPE 100529.

Li, K. et al., "Experimental Study of Wettability Alteration to Preferential Gas-Wetting in Porous Media and Its Effects", SPE Reservoir Eval. and Eng 3 (2), pp. 139-149, 2000.

Mahadevan et al., "Clean-up of Water Blocks in Low Permeability Formations", SPE 84216, SPE Annual Technical Conference and Exhibition held in Denver, Colorado, Oct. 5-8, 2003.

Noh et al., "Experimental Study of Wettability Alteration for Reservoir Rock", Project 3-Gas Condensate Reservoirs Part 2, Reservoir Engineering Research Institute, Apr. 1-Jun. 30, 2Q.05, 2005.

Noh et al., "Effect of Wettability on High-Velocity Coefficient in Two-Phase Gas-Llquid Flow", SPE 102773, 2006 SPE Annual Technical Conference and Exhibition held in San Antonion, TX, Sep. 24-27, 2006.

Tang et al., "Relative Permeability Modification in Gas-Liquid Systems Through Wettability Alteration to Intermediate Gas-Wetting", presented at the 2000 SPE Annual Technical Conference and Exhibition held in Dallas, Texas, Oct. 1-4, 2000, SPE 62934.

U.S. Application entitled " Compositions Containing Silanes", filed Aug. 23, 2006, having U.S. Appl. No. 11/466,620.

U.S. Application entitled "Compositions and Methods for Improving the Productivity of Hydrocarbon Producing Wells", filed Aug. 22, 2007, having U.S. Appl. No. 11/843,526.

U.S. Application entitled "Method of Obtaining a Treatment Composition for Improving the Productivity of Hydrocarbon Producing Wells", filed Aug. 23, 2006, having U.S. Appl. No. 11/508,690.

U.S. Application entitled "Compositions and Methods for Treating a Water Blocked Well", filed Mar. 23, 2007, having U.S. Appl. No. 60/896,883.

U.S. Application entitled "Compositions and Methods for Treating a Water Blocked Well", filed Mar. 23, 2007, having U.S. Appl. No. 60/896,880.

PCT Application entitled "Particles Comprising Fluorinated Siloxane and Methods of Making and Using the Same", filed Dec. 5, 2007, having application No. PCT/US2007/086462.

U.S. Application entitled "Method of Treating Proppants and Fractures In-situ with Fluorinated Silane", filed Dec. 5, 2007, having U.S. Appl. No. 60/992,442.

* cited by examiner

SANDSTONE HAVING A MODIFIED WETTABILITY AND A METHOD FOR MODIFYING THE SURFACE ENERGY OF SANDSTONE

CROSS REFERENCE TO RELATED APPLICATIONS

This application is a continuation-in-part of U.S. application Ser. No. 11/466,611, filed Aug. 23, 2006 now abandoned, which is a continuation-in-part of U.S. application Ser. No. 11/428,731, filed Jul. 5, 2006 now abandoned, and claims the benefit of U.S. Provisional Application No. 60/813,599, filed Feb. 21, 2006.

BACKGROUND

Fluorochemical compounds are well known and commercially used, for example, to coat various substrates and for surface-energy modification purposes, and may provide desirable macroscopic properties (e.g., soil repellency and soil release).

In other technologies, it has been common practice to inject well stimulation fluids into selected oil- and/or gas-bearing geological formations and/or strata to overcome problems resulting in reduced productivity in such formations. Typically, well stimulation fluids operate by hydraulic fracturing of and/or acidic reaction with the formations and/or strata. The well stimulation fluids may prevent a decrease in the permeability of the formation to oil and/or gas and also prevent a decrease in the rate of delivery of oil and/or gas to the wellhead.

While fluorochemical compounds are known as components in well stimulation fluids, not all fluorochemical-based surface-active agents are suitable as well stimulants. Some do not provide well stimulation, while others provide some stimulation but are too quickly removed from the formations and/or strata during extraction of oil or gas and thus, in practice, do not provide adequate sustained performance.

SUMMARY

Therefore, there is a continued need for improved well stimulants and well stimulation methods.

In one aspect, the present invention relates to a method for modifying the wettability of sandstone. The method comprises applying a chemical formulation to sandstone bearing at least one of oil or gas. The chemical formulation comprises a polar organic solvent, water, and a fluorochemical represented by the formula:

$$R_fSO_2-N(R)(C_nH_{2n})CHZ(C_mH_{2m})N(R')SO_2R_f,$$

wherein
- each $R_f$ is independently $-C_pF_{2p+1}$, where p is an integer from 2 to 5;
- R is selected from the group consisting of an aryl group and a $C_1$ to $C_6$ alkyl group;
- m and n are each independently integers from 1 to 20;
- Z is selected from the group consisting of —H and a group having the formula $-(C_tH_{2t})-X-Q-Si(Y')_w(Y)_{3-w}$, in which t is an integer from 0 to 4; —X— is selected from the group consisting of —O—, —S— and —NH—; -Q- is selected from the group consisting of —C(O)NH—$(CH_2)_v$— and —$(CH_2)_v$—; v is an integer from 1 to 20; Y is a hydrolyzable group; Y' is a non-hydrolyzable group; and w is an integer from 0 to 2; and
- R' is selected from the group consisting of R and a group represented by the formula $-(CH_2)_v-Si(Y')_w(Y)_{3-w}$, with the proviso that when Z is —H, R' is a group represented by the formula $-(CH_2)_v-Si(Y')_w(Y)_{3-w}$.

The chemical formulation also comprises a catalyst for hydrolyzing the Si—Y bond. The catalyst comprises one of an acid compound or alkaline compound.

In another aspect, the method further comprises covalently bonding the sandstone to a side-chain derived from the fluorochemical. The side-chain is represented by the formula:

$$[R_fSO_2-N(R)(C_nH_{2n})]_2CHZ'$$

wherein
- each $R_f$ is independently $-C_pF_{2p+1}$, where p is an integer from 2 to 5;
- each R is independently selected from the group consisting of an aryl group and a $C_1$ to $C_6$ alkyl group;
- n is an integer from 1 to 20; and
- Z' is a group of the formula $-(C_tH_{2t})-X-Q-Si(Y')_w-$, in which t is an integer from 0 to 4; —X— is selected from the group consisting of —O—, —S— and —NH—; -Q- is selected from the group consisting of —C(O)NH—$(CH_2)_v$— and —$(CH_2)_v$—; v is an integer from 1 to 20, Y' is a non-hydrolyzable group, and w is an integer from 0 to 2.

In this general structure, the Si atom shares at least one covalent bond with the sandstone.

In yet another aspect, the present invention relates to a composition comprising a sandstone bearing at least one of oil or gas. The composition further comprises a side-chain covalently bonded to the sandstone, wherein side-chain is represented by the formula:

$$[R_fSO_2-N(R)(C_nH_{2n})]_2CHZ'$$

wherein
- each $R_f$ is independently $-C_pF_{2p+1}$ where p is an integer from 2 to 5;
- each R is independently selected from the group consisting of an aryl group and a $C_1$ to $C_6$ alkyl group;
- n is an integer from 1 and 20; and
- Z' is a group of the formula $-(C_tH_{2t})-X-Q-Si(Y')_w-$, in which t an integer from 0 to 4; —X— is selected from the group consisting of —O—, —S— and —NH—; -Q- is selected from the group consisting of —C(O)NH—$(CH_2)_v$— and —$(CH_2)_v$—; v is an integer from 1 to 20; Y' is a non-hydrolyzable group, w is an integer from 0 to 2, and the Si shares at least one covalent bond with the sandstone.

In some embodiments, the methods of the present invention modify the wettability of sandstone bearing at least one of oil or gas. In some of these embodiments, the sandstone is a subterranean gas reservoir that is blocked by liquid hydrocarbons (gas condensate, e.g., at least one of methane, ethane, propane, butane, hexane, heptane, or octane) near the well bore. In some instances, the wettability modification increases fluid mobility through the sandstone. When used in oil and/or gas bearing formations, such an increase in fluid mobility may correspond to higher hydrocarbon production for a well located on the formation. In contrast with existing methodologies, modification using the fluorochemicals described herein may provide tenacious, and in some embodiments permanent, wettability alteration, and/or generally do not decrease permeability.

DETAILED DESCRIPTION

In one aspect, methods described herein include applying a chemical formulation to sandstone bearing at least one of oil or gas. The chemical formulation comprises a polar organic solvent, water, a fluorochemical, and a catalyst.

The formulation described herein contains at least one silane of the formula I:

$$R_fSO_2-N(R)(C_nH_{2n})CHZ(C_mH_{2m})N(R')SO_2R_f \qquad (I)$$

wherein each $R_f$ is independently $-C_pF_{2p+1}$, where p is an integer from 2 to 5;

R is selected from the group consisting of an aryl group and $C_1$ to $C_6$ alkyl group;

m and n are each independently integers from 1 to 20;

Z is selected from the group consisting of —H and a group having the formula $-(C_tH_{2t})-X-Q-Si(Y')_w(Y)_{3-w}$, in which t is an integer from 0 to 4; —X— is selected from the group consisting of —O—, —S— and —NH—; -Q- is selected from the group consisting of $-C(O)NH-(CH_2)_v-$ and $-(CH_2)-$; v is an integer from 1 to 20; Y is a hydrolyzable group; Y' is a non-hydrolyzable group; and w is an integer from 0 to 2; and R' is selected from the group consisting of R and a group represented by the formula $-(CH_2)_v-Si(Y')_w(Y)_{3-w}$, with the proviso that when Z is —H, R' is a group represented by the formula $-(CH_2)_v-Si(Y')_w(Y)_{3-w}$.

The perfluoroalkanesulfonamido groups ($R_fSO_2N-$) may be the same or different. The perfluoroalkyl groups may each contain 2 to 5 carbon atoms and may be linear, branched or cyclic. In some embodiments, each $R_f$ has 4 carbon atoms (i.e., p is 4).

In formula I, m and n may each independently be integers from 1 to 20. In some embodiments, each m and n is independently an integer from 1 to 6. Throughout this application, integer ranges from X to Y are understood to include the endpoints, X and Y.

In some embodiments of the fluorochemical, p is 4, R is $-CH_3$, m and n are both 1, and Z is $-O-(CH_2)_3Si(OCH_3)_3$, $-O-(CH_2)_3Si(OCH_2CH_3)_3$ or $-OC(O)NH-(CH_2)_3Si(OCH_2CH_3)_3$. In some of these embodiments, R' is $-CH_3$.

The term "alkyl" as used herein, refers to straight chain, branched, and cyclic alkyl. For example, $C_1$ to $C_6$ alkyl includes methyl, ethyl, propyl, isopropyl, butyl, cyclobutyl, isobutyl, and tertiary butyl. In some embodiments, each R is independently $-CH_3$ or $-CH_2CH_3$. In some embodiments, R and R' are each independently $-CH_3$ or $-CH_2CH_3$. In some embodiments, R and R' are each $-CH_3$.

The term "aryl" as used herein includes aromatic rings or multi-ring systems optionally containing one or more ring heteroatoms (e.g., O, S, N). Examples of aryl groups include phenyl, naphthyl, and pyridinyl. Aryl groups may be unsubstituted or may be substituted by one or up to five substituents such as alkyl, as above defined, alkoxy of 1 to 4 carbon atoms, halo (e.g., fluoro, chloro, bromo, iodo), hydroxyl, amino, and nitro. When substituents are present, halo and alkyl substituents are preferred.

In some embodiments of formula I, v is 1 to 10, and in some embodiments, v is 3.

The term "hydrolyzable group" refers to a group which either is directly capable of undergoing condensation reactions under appropriate conditions or which is capable of hydrolyzing under appropriate conditions, to yield a compound that is capable of undergoing condensation reactions. Appropriate conditions include acidic or basic aqueous conditions, optionally in the presence of another condensation catalyst (in addition to the acid or base).

The hydrolyzable groups Y may be the same or different and are generally capable of hydrolyzing under appropriate conditions. Appropriate conditions include, for example, acidic or basic conditions in the presence of water. Hydrolysis of the Y groups may allow the fluorochemical to participate in condensation reactions. The hydrolyzable groups upon hydrolysis may yield groups capable of undergoing condensation reactions, such as silanol groups.

Examples of hydrolyzable groups include, for instance, halogens such as chlorine, bromine, iodine, or fluorine; alkoxy groups of the general formula —OR" (wherein, R" represents a lower alkyl group, preferably containing 1 to 6 carbon atoms, which may optionally be substituted by one or more halogen atoms); acyloxy groups of the general formula —O(CO)—R" (wherein R" is as indicated for the alkoxy groups); aryloxy groups of the general formula —OR''' (wherein R''' represents an aryl moiety that may contain, for instance, 6 to 12 carbon atoms, which may further optionally be substituted by one or more substituents independently selected from halogens and $C_1$ to $C_4$ alkyl groups, the $C_1$ to $C_4$ alkyl groups optionally being substituted by one or more halogen atoms); or poly(oxyalkylene)groups, in which the oxyalkylene unit in the poly(oxyalkylene) group preferably has 2 or 3 carbon atoms, such as $-OCH_2CH_2-$, $-OCH_2CH_2CH_2-$ and $-OCH(CH_3)CH_2-$; the oxyalkylene units can be the same, as in poly(oxyethylene), or present as a mixture, as in straight or branched chain or randomly distributed oxyethylene and oxypropylene units. In each of these formulae, R" and R''' may include linear, branched, and/or cyclic structures. Specific examples of hydrolyzable groups include chlorine, methoxy, ethoxy, and propoxy.

The non-hydrolyzable groups Y' may be the same or different and are generally not capable of hydrolyzing under conditions for condensation reactions, (e.g., acidic or basic aqueous conditions where hydrolyzable groups are hydrolyzed). The non-hydrolyzable groups Y' may be independently a hydrocarbon group, for example an alkyl group, for instance having 1 to 6 carbon atoms, or an aryl group. The hydrocarbon group may be fluorinated or non-fluorinated. The alkyl group may be branched or unbranched. In some embodiments, Y' is selected from the group consisting of a $C_1$ to $C_6$ alkyl group and a $C_6$ to $C_{10}$ aryl group.

Representative fluorochemicals used in the method of this invention include, $[C_4F_9SO_2N(CH_3)CH_2]_2CHOCH_2CH_2CH_2Si(OCH_3)_3$, $[C_4F_9SO_2N(CH_3)CH_2]_2CHOCH_2CH_2CH_2Si(OCH_2CH_3)_3$, $[C_4F_9SO_2N(CH_3)CH_2]_2CHOC(O)NHCH_2CH_2CH_2Si(OCH_3)_3$, $[C_4F_9SO_2N(CH_3)CH_2]_2CHOC(O)NHCH_2CH_2CH_2Si(OCH_2CH_3)_3$, and $C_4F_9SO_2N(CH_3)CH_2CH_2CH_2N(SO_2C_4F_9)CH_2CH_2CH_2Si(OCH_3)_3$.

The fluorochemicals described herein may be prepared by known methods. For example, $[C_4F_9SO_2N(CH_3)CH_2]_2CHOH$ may be made by reacting two moles of $C_4F_9SO_2NH(CH_3)$ with either 1,3-dichloro-2-propanol or epichlorohydrin in the presence of base. $[C_4F_9SO_2N(CH_3)CH_2]_2CHOCH_2CH_2CH_2Si(OCH_3)_3$ can be made from $[C_4F_9SON(CH_3)CH_2]_2CHOH$ by alkylation with $ClCH_2CH_2CH_2Si(OCH_3)_3$ or by alkylation with allyl chloride, followed by hydrosilation with $HSiCl_3$ and methanolysis. Reaction of $[C_4F_9SO_2N(CH_3)CH_2]_2CHOH$ with $OCNCH_2CH_2CH_2Si(OCH_3)_3$ yields $[C_4F_9SO_2N(CH_3)CH_2]_2CHOCONHCH_2CH_2CH_2Si(OCH_3)_3$. Reaction of $[C_4F_9SO_2N(CH_3)CH_2]_2CHOH$ with $OCNCH_2CH_2CH_2Si(OCH_2CH_3)_3$ yields $[C_4F_9SO_2N(CH_3)CH_2]_2CHOCONHCH_2CH_2CH_2Si(OCH_2CH_3)_3$.

Without wishing to be bound by theory, it is believed that tenacious side-chains of the fluorochemical are bound to the sandstone through a condensation reaction that provides a W—Si—O—Si bond, wherein W represents the fluorochemical side-chain, which is ultimately covalently bonded to a Si in the sandstone.

The chemical formulation further comprises water, preferably in an amount effective to hydrolyze the hydrolyzable groups. In some embodiments, the amount of water will be in a range from 0.1 to 30% by weight of the total chemical formulation, in particular up to 15% by weight, up to 10% by weight, or up to 5% by weight. In other embodiments, water is present in an amount of at least 1% by weight, at least 5% by weight, or at least 10% by weight of the total chemical formulation. In addition to water, the chemical formulation may comprise a catalyst for hydrolyzing the Si—Y bond. The catalyst may comprise an acid compound or an alkaline compound.

When the catalyst comprises an acid compound, it may be an organic or inorganic acid. Organic acids include acetic acid, citric acid, formic acid, triflic acid, perfluorobutyric acid, and combinations thereof. In some embodiments, the organic acid is soluble in a polar organic solvent, also part of the chemical formulation. Inorganic acids include sulfuric acid, hydrochloric acid, hydroboric acid, phosphoric acid, and combinations thereof. The acid compounds also include acid precursors that form an acid when contacted with water. Combinations of any of these acids are also contemplated by the present chemical formulations.

When the hydrolysis catalyst comprises an alkaline compound, examples include amines, alkali metal hydroxides, alkaline earth metal hydroxides, and combinations thereof. Particular examples include sodium hydroxide, potassium hydroxide, sodium fluoride, potassium fluoride, and trimethylamine.

The hydrolysis catalyst can generally be used in amounts in a range from 0.01 to 10%, but may be used in amount of at least 0.05%, at least 0.1%, at least 1%, or at least 5%, and in amounts up to 8%, up to 5%, up to 1%, or up to 0.1%, by weight based on the total weight of the chemical formulation.

The chemical formulations described herein may further comprise one or more organic solvents (e.g., polar organic solvents). The organic solvent or mixture of organic solvents is capable of dissolving one or more silanes of formula I, and optionally a mixture of silanes of formula I. Additionally, when an organic acid is used, the organic solvent may be chosen so that the organic acid is soluble in the organic solvent. Examples of organic solvents include aliphatic alcohols, (e.g., methanol, ethanol, isopropanol, and butanol); ketones (e.g., acetone and methyl ethyl ketone); esters (e.g., ethyl acetate and methyl formate); ethers (e.g., diethyl ether, tetrahydrofuran (THF), and dipropyleneglycol monomethylether (DPM)); nitriles (e.g., acetonitrile); and formamides (e.g., dimethylformamide). In some embodiments, the polar organic solvent comprises at least one of an alcohol, a ketone, a nitrile, or a formamide. In some embodiments, the polar organic solvent comprises at least one of methanol, ethanol, propanol, butanol, acetone, acetonitrile, or dimethylformamide. In some embodiments, the polar organic solvent comprises at least one of methanol, ethanol, propanol, or butanol. In some embodiments, the polar organic solvent is selected such that it has the formula Y—H where Y is the hydrolyzable group of the fluorochemical.

The chemical formulation may be applied to sandstone bearing at least one of oil or gas. Sandstone is known to comprise $SiO_2$. Typically, sandstone contains in a range of 50 to 80% $SiO_2$ by weight. Other components of sandstone may include: $Al_2O_3$, $Fe_2O_3$, MgO, CaO, $Na_2O$, $K_2O$, $TiO_2$, $P_2O_5$, and MnO. The temperature of application may, for example, be in a range from 20° C. to 220° C. The temperature may vary from 40° C. and higher, 50° C. and higher, even 100° C. and higher to up to 180° C., up to 150° C., even up to 200° C.

In another aspect, the method may further comprise modifying the wetting of the sandstone. Wettability modification may help increase well deliverability of oil and/or gas in a sandstone formation. Wettability can play a role in condensate accumulation around a wellbore. The effect of wettability on condensate accumulation in porous media can be expressed with the Young-Laplace equation: $P_c=(2\sigma \cos \theta)/r$ where the capillary pressure PC is proportional to interfacial tension ($\sigma$) and the cosine of the pseudocontact angle ($\cos \theta$), and is inversely proportional to pore size (r). Thus, according to the Young-Laplace equation, decreasing the cosine of the pseudocontact angle for a given liquid will correspondingly decrease the capillary pressure and thus may increase well deliverability by decreasing condensate accumulation or water around a wellbore.

In one aspect, modifying the wetting of the sandstone is selected from the group consisting of modifying the gas wetting, modifying the liquid wetting, and modifying a combination thereof. In some embodiments, the gas wetting is increased while the liquid wetting is decreased.

Reducing the rate of imbibition of materials such as water, oil, or both, may also improve well deliverability. In some embodiments, the method may further comprise reducing the rate of imbibition of oil in the sandstone. One convenient proxy for measuring the rate of imbibition of hydrocarbon is the measurement of the rate of imbibition of n-decane. Accordingly, in yet another aspect, the method may further comprise reducing the rate of n-decane imbibition of the sandstone. In other embodiments, the method may further comprise reducing the rate of water imbibition of the sandstone.

To measure the wettability effect on condensate accumulation as described above, the present method may comprise injecting a fluid into a sandstone core (e.g., a Berea sandstone core). This injection will produce a maximum pressure drop across the sandstone formation. The method also comprises applying a chemical treatment to the sandstone as described herein. When the wettability of the sandstone is reduced for the liquid injected into the sandstone formation, the method further comprises reducing the maximum pressure drop across the sandstone formation. The effectiveness of the treatment may be manifested as a lower measured pressure drop. The pressure drop, if any, can be 5% or more with respect to the pressure across an untreated core, 10% or more, 20% or more, 30% or more, even 50% or more. The maximum pressure drop can be up to 95%, up to 90%, up to 75%, up to 70%, up to 50%, or even up to 40%.

In yet another aspect, the method further comprises extracting from the sandstone formation materials selected from the group consisting of oil, gas, and combinations thereof.

The method may further comprise covalently bonding the sandstone with a side-chain derived from the fluorochemical. The side-chain may be represented by the formula II:

$$[R_fSO_2-N(R)(C_nH_{2n})]_2CHZ' \quad (II).$$

In formula II, each $R_f$ is independently $-C_pF_{2p+1}$, where p is 2 to 5. The perfluoroalkanesulfonamido groups ($R_fSO_2N-$) may be the same or different. The perfluoroalkyl may each contain 2 to 5 carbon atoms and may be linear, branched or cyclic. In some embodiments, each has 4 carbon atoms.

Also in formula II, each R is independently selected from the group consisting of an aryl group and a $C_1$ to $C_6$ alkyl group and n is an integer from 1 to 20.

Z' is a group of the formula $-(C_tH_{2t})-X-Q-Si-(Y')_w-$, in which t is an integer from 0 to 4. In Z', $-X-$ is selected from the group consisting of $-O-$, $-S-$ and $-NH-$, -Q- is selected from the group consisting of $-C(O)NH-(CH_2)_v-$ and $-(CH_2)_v-$, Y' is a non-hydrolyzable group, and w is an integer from 0 to 2. In Q, v is an integer from 1 to 20. In the side-chain defined by formula II the Si atom shares at least one covalent bond with the sandstone. This bond to the sandstone may allow the side-chain to tenaciously alter the wettability of the sandstone. In some embodiments, the bond to the sandstone provides a permanent wettability alteration.

In another aspect, the present description provides a composition comprising a sandstone bearing at least one of oil or gas, and a side-chain covalently bonded to the sandstone. The side-chain is given by formula II. This composition may allow for the expedient extraction of oil and/or gas from a sandstone or sandstone formation bearing at least one of these.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

For the following examples, single-core testing is carried out by the following procedures:

Imbibition Measurements:

Liquid was injected into an air-saturated core. The liquid was either tap-water or brine at 24° C. or 140° C., n-decane at 24° C. or tetradecane at 140° C. The air-saturated core was placed in a core-holder. Liquid was injected at the inlet at a constant rate, while the outlet pressure was maintained constant (either atmospheric pressure or 150 psi (1034 kPa)). Liquid injection continued until steady state was achieved. The increase in pressure drop versus time (or pore volume injection) and the average liquid saturation at breakthrough and/or at steady state were measured.

Spontaneous liquid imbibition into the air-saturated cores was measured at temperatures of 24° C., 60° C., and 80° C. for water (tap-water), and at 24° C. for n-decane. The air-saturated core was placed inside the liquid while suspended under an electronic balance. The increase in weight and the average liquid saturation was plotted as a function of the time. If the core was strongly liquid wet, most of the imbibition occurred during the first 30 minutes, where a liquid saturation of more than 60% was obtained, as is the case of untreated Berea sandstone. The rate of imbibition decreased as the wettability is altered to intermediate gas-wetting. Liquid saturations of less than 5% were obtained in some cases after more than 20 hours of imbibition.

Capillary Pressure Measurements:

Two-core-parallel flow testing was performed with a tap-water or brine injection at 24 or 80° C., and with decane at 24° C. Two air-saturated cores were placed in two core-holders and liquid was injected with a constant rate at the common inlet, while the outlet was open to atmospheric pressure. Both cores were under the same pressure drop. The pressure drop across the system as well as the liquid flow rates in both cores were measured and plotted against time.

Preparation of the Compounds

Unless otherwise noted, all parts, percentages, ratios, etc. in the examples and the rest of the specification are by weight.

Preparation of [$C_4F_9SO_2N(CH_3)CH_2$]$_2$CHOH

A three-necked round bottom 1000-mL flask, fitted with a stirrer, heating mantle, condenser, nitrogen inlet, Dean-Stark trap and thermometer was charged with $C_4F_9SO_2N(CH_3)H$ [313 grams (g), 1.00 mole (mol)], generally made as described in U.S. Pat. No. 6,664,354 (Savu et al.), Example 1, Part A, which patent is incorporated herein by reference, N,N-dimethylformamide (100 g) and heptane (40 g). The mixture was heated to reflux and dried by azeotropic distillation. The mixture was cooled to about 30° C. under nitrogen purge, and sodium methoxide (30% in methanol, 180 g, 1.00 mol) was added. The mixture was heated at 50° C. for one hour, stripping off methanol under vacuum from an aspirator. 1,3-dichloro-2-propanol (65 g, 0.50 mol) was added to the flask and the temperature was elevated to 80° C. and held overnight. The ensuing mixture was washed with deionized water (300 mL at 80° C.) three times and the remaining organic layer was separated and dried in an oven at 120° C. for 1 hour. Vacuum distillation at 150° C. to 200° C. at 0.1 to 0.5 mmHg (13 to 67 Pa) resulted in 275 g of product. Analysis of the resulting yellow brown solid was consistent with [$C_4F_9SO_2N(CH_3)CH_2$]$_2$CHOH.

Preparation of [$C_4F_9SO_2N(CH_3)CH_2$]$_2$CHOC(O)NH $(CH_2)_3Si(OCH_2CH_3)_3$

A three-necked round bottom 500 mL flask fitted with a stirrer, heating mantle, condenser, nitrogen inlet, Dean-Stark trap and thermometer was charged with [$C_4F_9SO_2N(CH_3)$ $CH_2$]$_2$CHOH (204.6 g, 0.300 mol), and methyl ethyl ketone (250 g). The mixture was heated and approximately 50 g of material was removed using the Dean-Stark trap. The mixture was cooled to 30° C., and $OCN(CH_2)_3Si(OCH_2CH_3)_3$ (74.4 g, 0.301 mol) and three drops of stannous octanoate were added. The mixture was heated at 75° C. under nitrogen for 16 hours. A clear, slightly yellow product ensued. Analysis of the product was consistent with [$C_4F_9SO_2N(CH_3)CH_2$]$_2$CHOC (O)NH(CH$_2$)$_3$ Si(OCH$_2$CH$_3$)$_3$.

Example 1

A core of Berea sandstone was treated with a chemical formulation containing 25% by weight of a fluorochemical represented by the formula: [$C_4F_9SO_2N(CH_3)CH_2$]$_2$CHOC (O)NH(CH$_2$)$_3$Si(OCH$_2$CH$_3$)$_3$, 5% by weight water, 5% by weight acetic acid, 65% by weight ethanol. The chemical formulation was applied to the sandstone core at 140° C.

Figure 1:
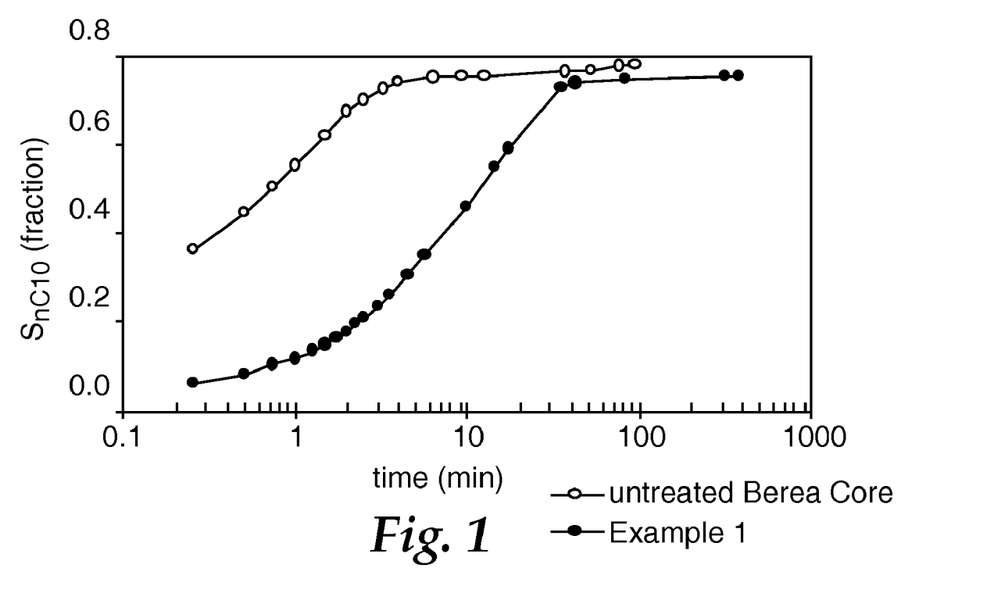
FIG. 1 shows a comparison of n-decane imbibition for Example 1.

The n-decane imbibition of an untreated Berea sandstone core and that of the treated core was measured at 24° C. The results are shown in FIG. 1.

Example 2

A core of Berea sandstone was treated with a chemical formulation containing 12% by weight of a fluorochemical represented by the formula: $[C_4F_9SO_2N(CH_3)CH_2]_2CHOC(O)NH(CH_2)_3Si(OCH_2CH_3)_3$, 5% by weight water, 5% by weight acetic acid, 73% by weight ethanol. The chemical formulation was applied to the sandstone core at 140° C.

Figure 2:
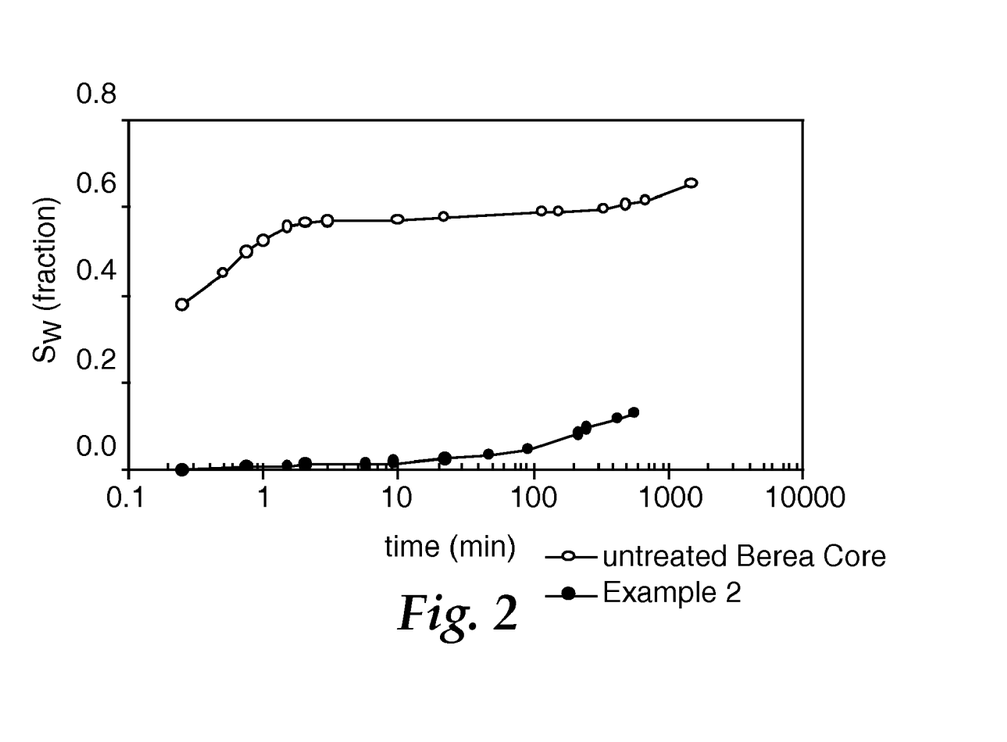
FIG. 2 shows a comparison of water imbibition for Example 2.

The water imbibition of an untreated Berea sandstone core and that of the treated core was measured at 24° C. The results are shown in FIG. 2.

Example 3

Figure 3:
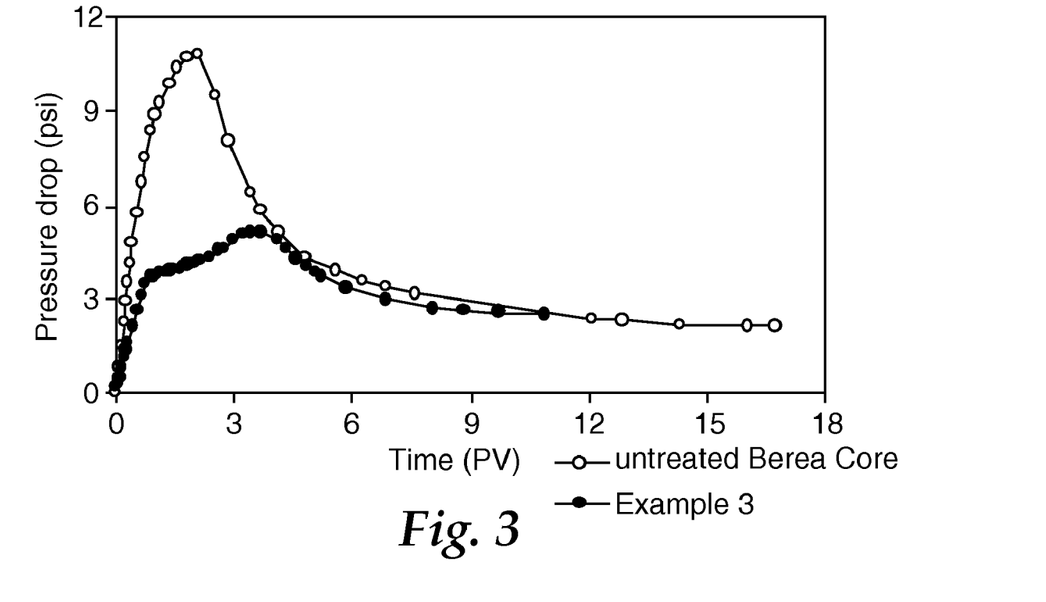
FIG. 3 shows a comparison of the pressure drop from n-decane injection for Example 3.

A treated Berea sandstone core was prepared as described in Example 1. In both the treated and untreated cores, n-decane was injected into the cores at a constant rate of 2 cc/min at 24° C. The pressure drop (capillary pressure) across the core was measured. The result for the treated core and untreated core are presented in FIG. 3 as a plot of pressure drop vs. pore volumes (PV).

Example 4

Figure 4:
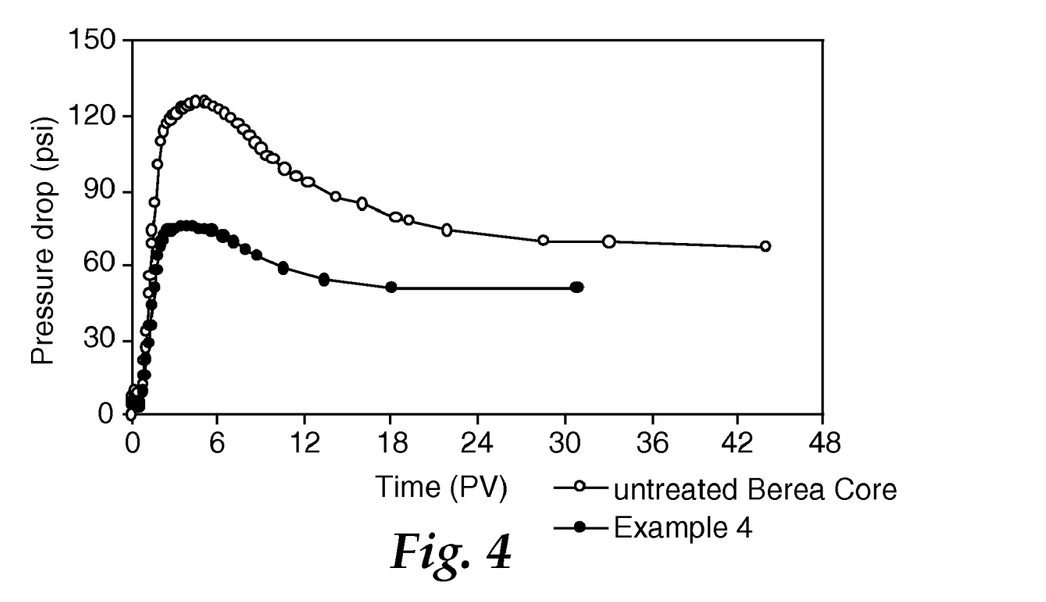
FIG. 4 shows a comparison of the pressure drop from water injection for Example 4.

A treated reservoir sandstone core was prepared as described in Example 1. Water was injected across the core both before treatment and after treatment. Water was injected at a rate of 7 cc/min. The pressure drop (capillary pressure) across the core was measured for both the treated core and the untreated core. The results for the treated core and untreated core are presented in FIG. 4 as a plot of pressure drop vs. pore volumes (PV).

Example 5

Figure 5:
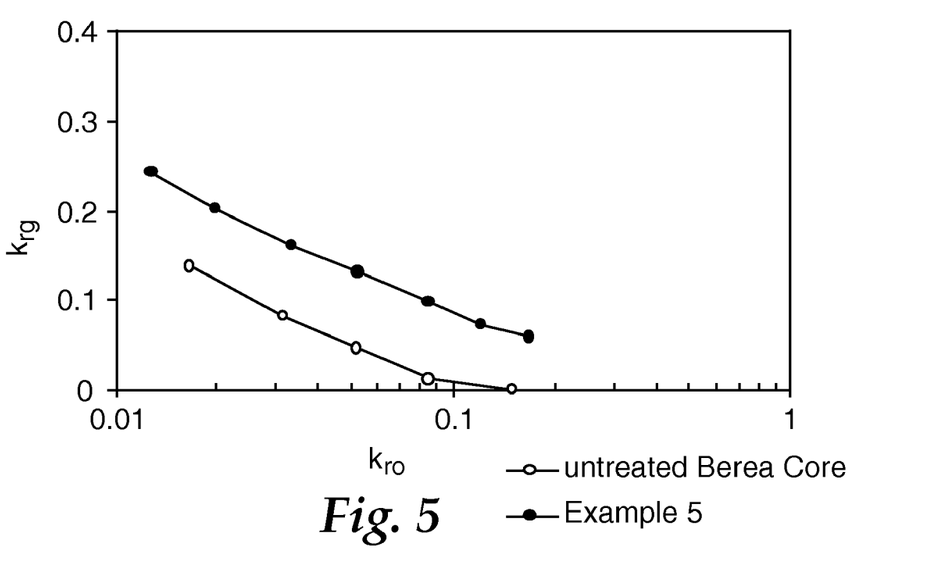
FIG. 5 shows a comparison of relative permeabilities of nitrogen and n-decane for Example 5.

A treated Berea sandstone core was prepared as described in Example 1. In each core, nitrogen and n-decane were simultaneously injected with a fixed pressure drop of 7 psi (48.3 kPa) at 24° C. The relative permeability of decane and nitrogen were measured. FIG. 5 shows a plot of krg (gas relative permeability) vs. kro (oil relative permeability). Treatment did not decrease absolute permeability.

Example 6

A treated Berea sandstone core was prepared as described in Example 1. The contact angle was visually estimated for both water/gas and oil/gas systems. These contact angles were compared to the contact angles for systems identical except that they include an untreated, rather than treated core. The results are shown in the table, below.

TABLE

| Core Type | Treatment | Water/Gas Pseudocontact Angle | Oil/Gas Pseudocontact Angle |
|---|---|---|---|
| Berea | No | 0° | 0° |
| Berea | Yes | 160° | 50° |

Various modifications and alterations of the invention may be made by those skilled in the art without departing from the scope and spirit of the invention, and it should be understood that this invention is not to be unduly limited to the illustrative examples.

What is claimed is:

1. A method for modifying the wettability of sandstone, the method comprising applying a chemical formulation to sandstone, the sandstone bearing at least one of oil or gas, and the chemical formulation comprising:

a polar organic solvent, water, a fluorochemical represented by the formula:

wherein each $R_f$ is independently —$C_pF_{2p+1}$, where p is an integer from 2 to 5;

R is selected from the group consisting of an aryl group and a $C_1$ to $C_6$ alkyl group;

m and n are each independently integers from 1 to 20;

Z is selected from the group consisting of —H and a group having the formula —$(C_tH_{2t})$—X-Q-Si(Y')$_w$(Y)$_{3-w}$, in which t is an integer from 0 to 4; —X— is selected from the group consisting of —O—, —S— and —NH—; -Q- is selected from the group consisting of —C(O)NH—(CH$_2$)$_v$— and —(CH$_2$)$_v$—; v is an integer from 1 to 20; Y is a hydrolyzable group; Y' is a non-hydrolyzable group; and w is an integer from 0 to 2; and R' is selected from R and a group represented by the formula —(CH$_2$)$_v$—Si(Y')$_w$(Y)$_{3-w}$, with the proviso that when Z is —H, R' is a group represented by the formula —(CH$_2$)$_v$—Si(Y')$_w$(Y)$_{3-w}$; and a hydrolysis catalyst for hydrolyzing the Si—Y bond, the hydrolysis catalyst comprising one of an acid compound or alkaline compound.

2. The method of claim 1, wherein p is 4, m is an integer from 1 to 6, and n is an integer from 1 to 6.

3. The method of claim 1, wherein p is 4; R is —CH$_3$; m and n are both 1; and Z is selected from the group consisting of —O—(CH$_2$)$_3$Si(OCH$_2$CH$_3$)$_3$, —O—(CH$_2$)$_3$Si(OCH$_3$)$_3$, and —OC(O)NH(CH$_2$)$_3$Si(OCH$_2$CH$_3$)$_3$.

4. The method of claim 1, wherein each Y is independently selected from the group consisting of a halogen, a $C_1$ to $C_6$ alkoxy group, a $C_1$ to $C_6$ acyloxy group, and an aryloxy group.

5. The method of claim 1, wherein Z is —H and R' is —(CH$_2$)$_v$—Si(Y)$_3$ and wherein each Y is independently selected from the group consisting of —Cl and a $C_1$ to $C_6$ alkoxy group.

6. The method of claim 1, wherein Y' is selected from the group consisting of a $C_1$ to $C_6$ alkyl group and a $C_6$ to $C_{10}$ aryl group.

7. The method of claim 1, wherein the polar organic solvent comprises at least one of an alcohol, a ketone, a nitrile, or a formamide.

8. The method of claim 1, wherein the polar organic solvent comprises at least one of methanol, ethanol, propanol, butanol, acetone, acetonitrile, or dimethylformamide.

9. The method of claim 1, wherein the polar organic solvent comprises at least one of methanol, ethanol, propanol, or butanol, and wherein Y is at least one of methoxy, ethoxy, propoxy, or butoxy.

10. The method of claim 1, wherein the acid compound comprises at least one of an organic acid or an inorganic acid.

11. The method of claim 10, wherein the acid is an organic acid soluble in the polar organic solvent, and wherein the organic acid is at least one of acetic acid, citric acid, formic acid, triflic acid, or perfluorobutyric acid.

12. The method of claim 10, wherein the acid is an inorganic acid, and wherein the inorganic acid comprises at least one of hydroboric acid, sulfuric acid, phosphoric acid, or hydrochloric acid.

13. The method of claim 1, wherein the acid compound is an acid precursor which forms an acid when contacted with water.

14. The method of claim 1, wherein the alkaline compound comprises at least one of an amine, an alkali metal hydroxide, or an alkaline earth metal hydroxide.

15. The method of claim 1, wherein applying takes place at least one temperature in a range from 20° C. to 220° C.

16. The method of claim 1, further comprising modifying the wetting of the sandstone, wherein the wetting is at least one of gas wetting or liquid wetting.

17. The method of claim 1, further comprising reducing the rate of at least one of n-decane imbibition of the sandstone or water imbibition of the sandstone.

18. The method of claim 1, wherein the sandstone is a sandstone formation penetrated by a well bore, and wherein the sandstone has at least one of an amount of water or an amount of condensate near the well bore.

19. The method of claim 18, wherein after the chemical formulation is applied to the sandstone, the amount of water near the well bore is decreased.

20. The method according to claim 1, further comprising extracting from the sandstone at least one of oil or gas.

21. The method of claim 1, further comprising covalently bonding the sandstone with a side-chain derived from the fluorochemical, the side-chain represented by the formula $$[R_fSO_2-N(R)(C_nH_{2n})]_2CHZ'$$

wherein
  each $R_f$ is independently $-C_pF_{2p+1}$, where p is an integer from 2 to 5;
  each R is independently selected from the group consisting of an aryl group and a $C_1$ to $C_6$ alkyl group;
  n is an integer from 1 to 20; and
  Z' is a group of the formula $-(C_tH_{2t})-X-Q-Si(Y')_w-$, in which t is an integer from 0 to 4; $-X-$ is selected from the group consisting of $-O-$, $-S-$ and $-NH-$; -Q- is selected from the group consisting of $-C(O)NH-(CH_2)_v-$ and $-(CH_2)_v-$; v is an integer from 1 to 20; Y' is a non-hydrolyzable group, w is an integer from 0 to 2; and the Si atom shares at least one covalent bond with the sandstone.

22. A composition comprising a sandstone bearing at least one of oil or gas, and a side-chain covalently bonded to the sandstone, the side-chain represented by the formula:

$$[R_fSO_2-N(R)(C_nH_{2n})]_2CHZ'$$

wherein
  each $R_f$ is independently $-C_pF_{2p+1}$, where p is an integer from 2 to 5;
  each R is independently selected from the group consisting of an aryl group and a $C_1$ to $C_6$ alkyl group;
  n is an integer from 1 to 20; and
  Z' is a group of the formula $-(C_tH_{2t})-X-Q-Si(Y')_w-$, in which t is an integer from 0 to 4; $-X-$ is selected from the group consisting of $-O-$, $-S-$ and $-NH-$;
  -Q- is selected from the group consisting of $-C(O)NH-(CH_2)_v-$ and $-(CH_2)_v-$; v is an integer from 1 to 20; Y' is a non-hydrolyzable group; w is an integer from 0 to 2; and the Si atom shares at least one covalent bond with the sandstone.

* * * * *

UNITED STATES PATENT AND TRADEMARK OFFICE
CERTIFICATE OF CORRECTION

PATENT NO. : 7,629,298 B2  Page 1 of 1
APPLICATION NO. : 12/013177
DATED : December 8, 2009
INVENTOR(S) : Manuel Jose Arco et al.

It is certified that error appears in the above-identified patent and that said Letters Patent is hereby corrected as shown below:

Column 6
Line 30, delete "PC" and insert -- $P_C$ --, therefor.

Column 9
Line 46 (approx.), delete "krg" and insert -- $k_{rg}$ --, therefor.

Line 47 (approx.), delete "kro" and insert -- $k_{ro}$ --, therefor.

Column 11
Line 13 (approx.), in Claim 15, delete "place" and insert -- place at --, therefor.

Signed and Sealed this

Sixteenth Day of November, 2010

David J. Kappos
*Director of the United States Patent and Trademark Office*